(12) United States Patent
Nielsen

(10) Patent No.: US 12,313,032 B2
(45) Date of Patent: May 27, 2025

(54) AERODYNAMIC ELEMENT FOR A BLADE OF A WIND TURBINE

(71) Applicant: Siemens Gamesa Renewable Energy A/S, Brande (DK)

(72) Inventor: Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/275,498

(22) PCT Filed: Dec. 14, 2021

(86) PCT No.: PCT/EP2021/085672
§ 371 (c)(1),
(2) Date: Aug. 2, 2023

(87) PCT Pub. No.: WO2022/167131
PCT Pub. Date: Aug. 11, 2022

(65) Prior Publication Data
US 2024/0110542 A1     Apr. 4, 2024

(30) Foreign Application Priority Data

Feb. 5, 2021   (EP) .................................. 21155476

(51) Int. Cl.
*F03D 1/06*   (2006.01)
*F03D 7/02*   (2006.01)

(52) U.S. Cl.
CPC ......... *F03D 1/0675* (2013.01); *F03D 7/0232* (2013.01); *F05B 2240/3052* (2020.08)

(58) Field of Classification Search
CPC ...... F03D 1/0675; F03D 7/0232; F03D 80/30; F05B 2240/3052; F05B 2240/30
See application file for complete search history.

(56) References Cited

U.S. PATENT DOCUMENTS

| 2,515,519 A * | 7/1950 | Lawrence ............ B64D 15/166 92/92 |
| 2,539,576 A * | 1/1951 | Gregg .................. B64D 15/166 285/200 |

(Continued)

FOREIGN PATENT DOCUMENTS

| EP | 2815125 A1 | 12/2014 |
| EP | 3008331 A1 | 4/2016 |

(Continued)

OTHER PUBLICATIONS

PCT International Preliminary Report On Patentability mailed Apr. 19, 2023 corresponding to PCT International Application No. PCT/EP2021/085672 filed Dec. 14, 2021.

*Primary Examiner* — J. Todd Newton
(74) *Attorney, Agent, or Firm* — Schmeiser, Olsen & Watts LLP

(57) ABSTRACT

A blade for a wind turbine includes: a suction side and a pressure side extending between a leading edge and the trailing edge, an energy distribution system having at least one external portion protruding from the suction side or the pressure side, at least one aerodynamic element attached to the suction side or the pressure side for aerodynamically shielding the external portion of the energy distribution system.

7 Claims, 4 Drawing Sheets

(56) References Cited

U.S. PATENT DOCUMENTS

| | | | |
|---|---|---|---|
| 2,970,794 A * | 2/1961 | Johnson | B64D 15/166 244/134 R |
| 4,826,108 A * | 5/1989 | Briscoe | B64D 15/16 244/134 A |
| 5,106,265 A * | 4/1992 | Holzem | F03D 7/0252 416/23 |
| 7,585,157 B2 | 9/2009 | Quell et al. | |
| 8,851,840 B2 * | 10/2014 | Hancock | F03D 1/0675 416/23 |
| 10,041,470 B2 | 8/2018 | Ramachandran et al. | |
| 10,202,963 B2 | 2/2019 | Altmikus | |
| 10,823,153 B2 * | 11/2020 | Enevoldsen | F03D 80/40 |
| 11,078,885 B2 * | 8/2021 | Akay | F03D 7/0232 |
| 11,506,182 B2 | 11/2022 | Bech et al. | |
| 11,761,423 B2 | 9/2023 | Blok et al. | |
| 2008/0292461 A1 | 11/2008 | Stiesdal | |
| 2009/0284016 A1 * | 11/2009 | van Dam | F03D 1/0675 416/41 |
| 2010/0034652 A1 * | 2/2010 | Battisti | F03D 80/40 29/889 |
| 2010/0247314 A1 * | 9/2010 | Narasimalu | F03D 7/0232 416/146 R |
| 2011/0116927 A1 * | 5/2011 | Hancock | F03D 7/0232 416/23 |
| 2011/0142595 A1 * | 6/2011 | Santiago | F03D 1/0675 416/235 |
| 2011/0217167 A1 * | 9/2011 | Hancock | F03D 1/0675 416/23 |
| 2012/0134803 A1 * | 5/2012 | McGrath | F03D 7/0252 416/1 |
| 2012/0224965 A1 * | 9/2012 | Behrens | F03D 7/0232 416/23 |
| 2012/0269640 A1 * | 10/2012 | Enevoldsen | F03D 1/065 416/223 R |
| 2018/0010579 A1 * | 1/2018 | Akay | F03D 1/0633 |
| 2019/0234376 A1 * | 8/2019 | Akay | F03D 1/0641 |
| 2020/0011290 A1 * | 1/2020 | Akay | F03D 7/022 |
| 2020/0011292 A1 * | 1/2020 | Akay | F03D 7/0232 |
| 2020/0080545 A1 | 3/2020 | Cao van Truong et al. | |
| 2022/0010771 A1 * | 1/2022 | Enevoldsen | F03D 1/0675 |
| 2022/0025855 A1 * | 1/2022 | Enevoldsen | F03D 7/0296 |
| 2022/0154686 A1 * | 5/2022 | Burchardt | F03D 7/022 |
| 2023/0220829 A1 * | 7/2023 | Enevoldsen | F03D 1/0633 |

FOREIGN PATENT DOCUMENTS

| | | |
|---|---|---|
| EP | 3128169 A1 | 2/2017 |
| EP | 3456961 A1 | 3/2019 |
| WO | 2017025352 A1 | 2/2017 |
| WO | 2018041420 A1 | 3/2018 |
| WO | 2018083185 A1 | 5/2018 |
| WO | 2019206386 A1 | 10/2019 |
| WO | 2020120005 A1 | 6/2020 |
| WO | 2020120037 A1 | 6/2020 |
| WO | 2020120330 A1 | 6/2020 |

* cited by examiner

AERODYNAMIC ELEMENT FOR A BLADE OF A WIND TURBINE

CROSS-REFERENCE TO RELATED APPLICATIONS

This application claims priority to PCT Application No. PCT/EP2021/085672, having a filing date of Dec. 14, 2021, which claims priority to EP Application No. 21155476.1, having a filing date of Feb. 5, 2021, the entire contents both of which are hereby incorporated by reference.

FIELD OF TECHNOLOGY

The following relates to an aerodynamic element for a blade of a wind turbine.

BACKGROUND

In wind turbines, an activation system may be provided for activating an active aerodynamic device provided on a surface of a wind turbine blade. The active aerodynamic device typically consists of a flap element installed on the external surface of the blade, which can be either retracted on the blade surface or lifted to modify the blade aerofoil properties.

The control of the retraction and lifting may be done by using a pressure supply system, for example a pneumatic pressure system, including a plurality of pressure ducts for feeding a pressure hose beneath the flap. By varying the pressure in the pressure hose, the flap may be lifted or retracted respectively away from and towards the blade surface. The pneumatic system is mainly installed inside the blade, but it may include at least an external portion (outer supply line) on the blade for reaching the hose.

The external portion of the pneumatic system may be positioned either on the pressure side or on the suction side of the blade, between the leading edge and the trailing edge. The positioning of the external portion on the blade may present a plurality of inconveniences. On an area close to the leading edge the presence of ducts may influence the flow of air around the blade, thus significantly reducing the performances of the turbine. Close to the trailing edge is a plurality of areas may not be used, due to the facts that:
 there are large stresses in the shell laminate in several positions,
 in other positions it is not possible to make outlet holes in the shell laminate because down conductor cables of the lightning protection system are present,
 the blade panel is normally thicker at the trailing edge than at the leading edge.

In addition to that the outer supply line needs to be longer when mounted closer to the trailing edge than when mounted closer to the leading edge of the blade section.

EP 3 128 169 A1 discloses an actuator arrangement for moving an aerodynamic device of the above-described type.

The above considerations may apply also to any other type of energy distribution system, which may be installed on the blade and which include an external portion protruding from the suction side or the pressure side. Such energy distribution system may be, for example, an electrical or communication circuit comprising at least one external electric of optic fibre cable protruding from the suction side or the pressure side. In particular, such electrical circuit may be the lightening protection system, including on or more electric cables to be placed on the external surface of the blade.

Hence, it is desirable to overcome the above inconveniences by providing an improved blade where the above described ducts or cables or similar devices may be installed on a plurality of positions on the blade, without determining the above described inconveniences.

SUMMARY

According to embodiments of the present invention, it is provided a blade for a wind turbine including:
 a suction side and a pressure side extending between a leading edge and the trailing edge,
 an energy distribution system having at least one external portion protruding from the suction side or the pressure side,
wherein the blade further includes:
 at least one aerodynamic element attached to the suction side or the pressure side for aerodynamically shielding said external portion of the energy distribution system.

According to embodiments of the present invention, the aerodynamic element may cover the external portion of the energy distribution system with respect to airflow flowing around the blade. According to other embodiments of the present invention, the aerodynamic element may be attached to the external portion of the energy distribution system, so that the aerodynamic properties of such external portions are improved. According to other embodiments of the present invention, the aerodynamic element may be integrated in the external portion of the energy distribution system, so that the aerodynamic properties of such external portions are improved.

According to an embodiment of the present invention, the energy distribution system is a pressure supply system for activating at least one active aerodynamic device provided on the suction side or the pressure side, the pressure supply system comprising at least one external duct protruding from the suction side or the pressure side, said aerodynamic element being attached to the suction side or the pressure side for covering said external duct.

According to another embodiment of the present invention, the energy distribution system is an electrical or communication circuit comprising at least one external cable protruding from the suction side or the pressure side, said aerodynamic element being attached to the suction side or the pressure side for aerodynamically shielding said external cable.

Embodiments of the present invention permits to remove a plurality of constraints when positioning the external portion of the energy distribution system. Such external portion may be for example positioned close to the leading edge, where less stresses are present in the blade panel. The aerodynamic element positioned over the external portion permits to conveniently reduce or avoid disturbances to the flow of air around the blade. The positioning may be optimized so that the overall length of the energy distribution system is made as short as possible. The aerodynamic element may be used for shielding any kind of duct, hose, cable or wire. The aerodynamic element may provide anti-stall properties. In wind turbine blades, crossflows of airflow sometimes propagate along the longitudinal length of the wind turbine blade, from the root end of the blade. Such crossflows act to negatively impact on blade performance, in particular by contributing to airflow detachment from the surface of the blade, thereby affecting blade lift. By providing an aerodynamic element which extends across the surface of a wind turbine blade, transverse to its longitudinal axis, the formation of such cross-flows may be prevented.

Further advantages are achieved when positioning the external ducts of a pressure supply system for activating active aerodynamic devices. In such cases, embodiments of the present invention permits to conveniently install the external portion on a leading-edge side of the blade section, which is normally free from conductors of the lightning protection system. Embodiments of the present invention therefore permits minimizing the conflicts between the pressure supply system of the aerodynamic devices and the lightning protection system. Positioning the external portion on a leading-edge side of the blade section may benefit from the fact that the blade panels are thinner at the leading-edge side than at the trailing edge side.

BRIEF DESCRIPTION

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
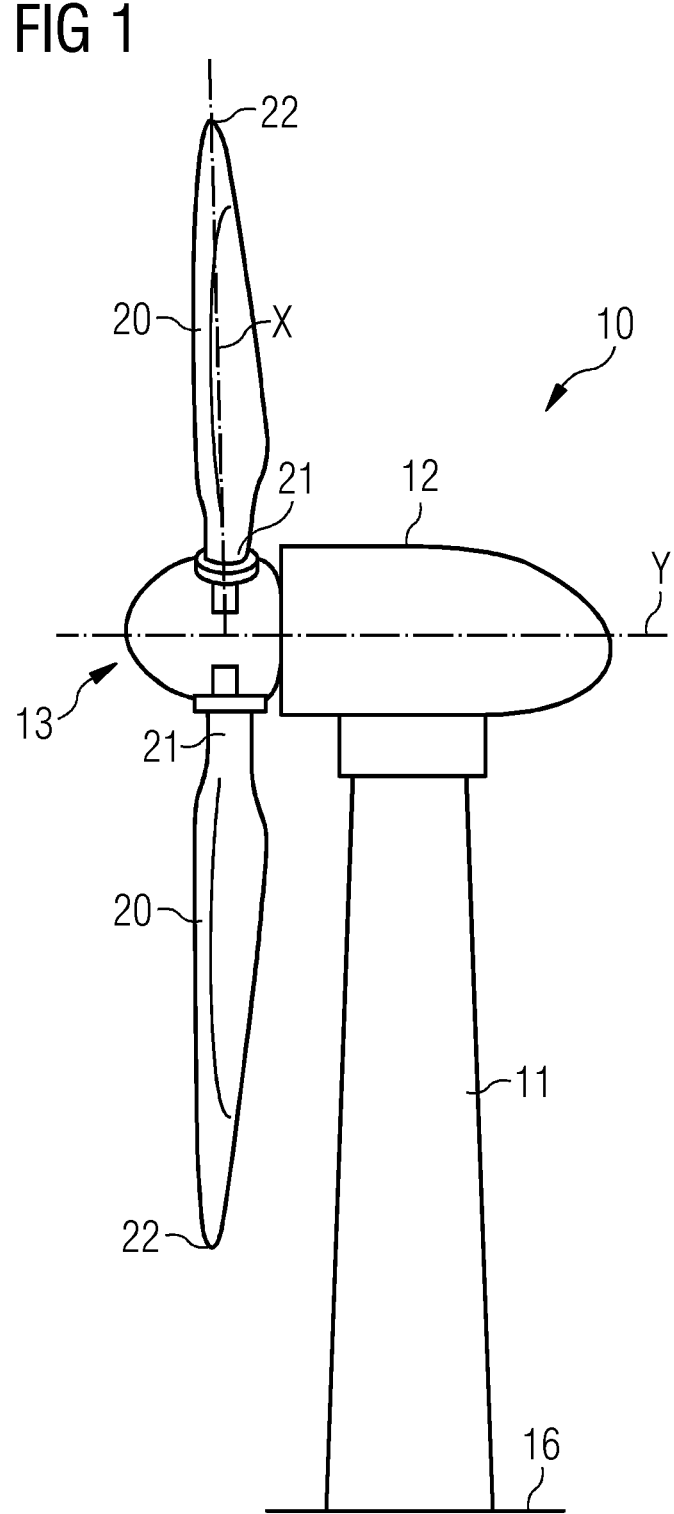
FIG. 1 shows a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y.

The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 20 extend substantially radially with respect to the rotational axis Y. Each rotor blade 20 is mounted to the hub 13 at its root section 21. The root section 21 is opposed to the tip section 22 of the rotor blade.

Figure 2:
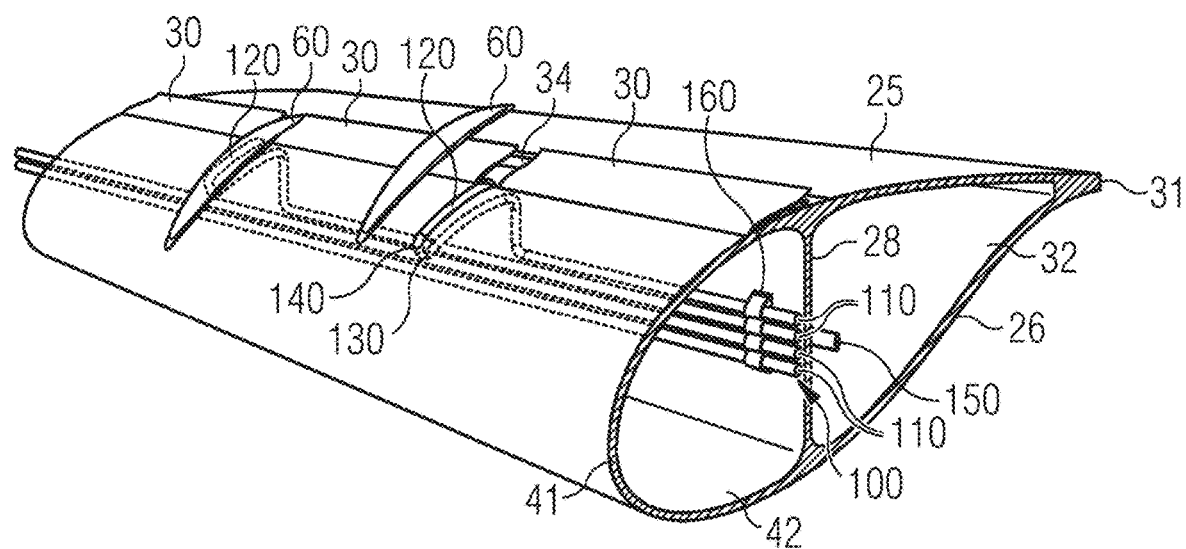
FIG. 2 shows a view of a portion of a rotor blade, according to a first embodiment of the present invention.
Figure 3:
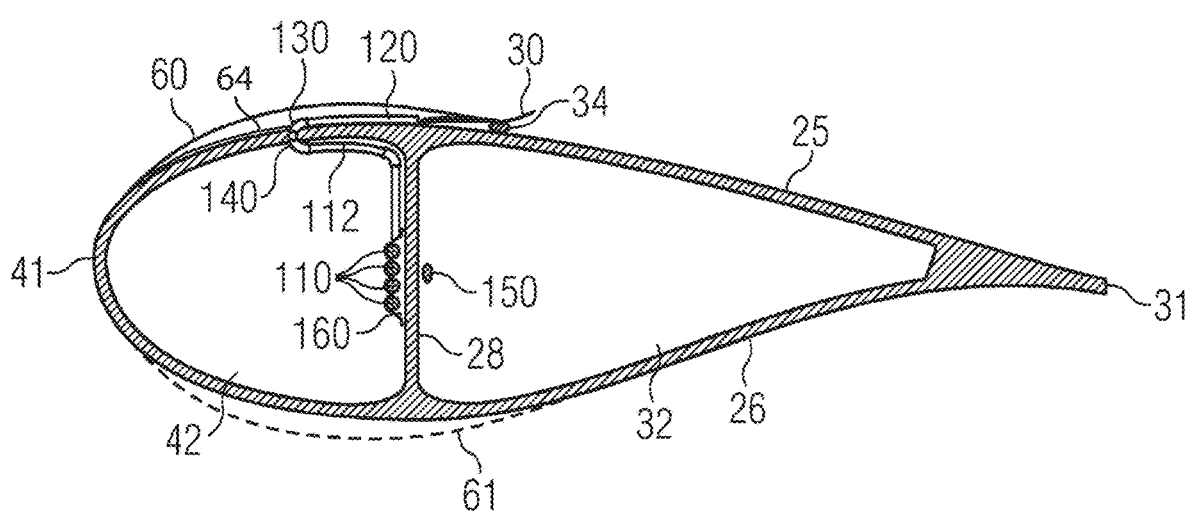
FIG. 3 shows a section view of the rotor blade of FIG. 2.

FIGS. 2 and 3 illustrate a portion of a hollow rotor blade 20 comprised between the root section 21 and the tip section 22, according to a first embodiment of the present invention. According to other embodiments of the present invention (not shown in the attached figures), the rotor blade 20 may be solid. According to the conventional naming of blade components, the rotor blade 20 comprises a suction side 25 and a pressure side 26, both extending from a leading edge 41 to a trailing edge 31 of the rotor blade 20. The suction side 25 and the pressure side 26 may be connected by one or more transversal shear webs 28 (one shear web 28 in the embodiments of the figures), which provide a reinforcement where the distance between the suction side 25 and the pressure side 26 are greater, i.e. at an intermediate between the leading edge 41 and the trailing edge 31. The shear web 28 divides the rotor blade 20 in a leading-edge side 42, comprised between the leading edge 41 and the shear web 28, and a trailing-edge side 32, comprised between the shear web 28 and the trailing edge 31. The rotor blade 20 comprises on or more aerodynamic devices 30 (four aerodynamic devices 30 in the embodiment of FIG. 3) in the form of an actuated spoiler. The aerodynamic devices 30 are arranged on the suction side 25 at an intermediate portion between the leading edge 41 and the trailing edge 31, over the shear web 28. According to other embodiments of the present invention (not shown in the attached figures), the aerodynamic devices 30 are arranged at the leading-edge side 42. According to other embodiments of the present invention (not shown in the attached figures), the aerodynamic devices are in the form of an actuated flap, i.e. an aerodynamic device installed at the trailing edge 31 of the rotor blade 20, or at the trailing-edge side 32, close to the trailing edge 31. The aerodynamic device 30 are movable by means of a pneumatic actuator 34 fed by a pressure supply system 100. The pneumatic actuator 34 may be realized as a hose comprising an elastic outer skin, such that it can inflate and deflate reversibly and during many cycles when operated by means of the pressure supply system 100. When the hose 34 is inflated the aerodynamic device 30 is moved in a protruded active configuration. When the hose 34 is deflated the aerodynamic device 30 is moved in a retracted inactive configuration, close to the blade.

The pressure supply system 100 comprises a plurality of inner supply lines 110 inside the leading-edge side 42 of the blade. The inner supply lines 110 are fixed to the shear web 28. The inner supply lines 110 may be fixed to the shear web 28 by means of a plurality of fixtures 160 glued to the shear web 28. The inner supply lines 110 a pressure pneumatic link between the hub 13, where controllers and pumps (not shown) are mounted, to the pneumatic actuator 34. The pressure supply system 100 further comprises one or more external ducts 120 (two external ducts 120 in the embodiment of FIGS. 3 and 4, each external duct being positioned between two adjacent aerodynamic device 30) protruding from the suction side 25 at the the leading-edge side 42. The external ducts 120 are arranged parallel to the suction side 25 and oriented chordwise with respect to the blade 20, i.e. following, in the section view of FIG. 3, the ideal line which connects the leading edge 41 and the trailing edge 31. The pressure supply system 100 further comprises one or more through-shell connectors 130, for connecting each of the external duct 120 to a respective inner supply line 110. Each through-shell connectors 130 is arranged through a respective shell hole 140 provided across the suction side 25 of the blade at the leading-edge side 42. Glue may be applied around the through-shell connectors 130 for sealing the respective shell hole 140.

The rotor blade 20 further includes a lightning protection system (LPS) including a conducting cable 150 positioned along the shear web 28 inside the trailing-edge side 32 of the blade 20. The lightning protection system (LPS) is therefore separated from the pressure supply system 100 by the shear web 28.

The rotor blade 20 further includes at least one aerodynamic element 60 attached to the suction side 25 for aerodynamically shielding the external portion 120 of the pressure supply system 100. In the embodiment of FIGS. 2 and 3, each aerodynamic element 60 is attached to the suction side 25 for covering a respective external duct 120. The aerodynamic element 60 avoid or reduce turbulence around external duct 120. The aerodynamic element 60 may be glued to the suction side 25 by a layer of glue 64 interposed between the aerodynamic element 60 and the suction side 25. Once aerodynamic element 60 is fixed to the rotor blade 20, it further provides protection against weather conditions and pollutants, by preventing water or humidity or dust or similar agents to enter the blade 20 through the shell hole(s) 140. This will make it even harder to get water penetration to the inner blade. Optionally, a second aerodynamic element 61 may be attached to the pressure side 26 at a symmetric position with respect to the aerodynamic element 60 on the suction side 25, to create aerodynamic balance.

Figure 4:
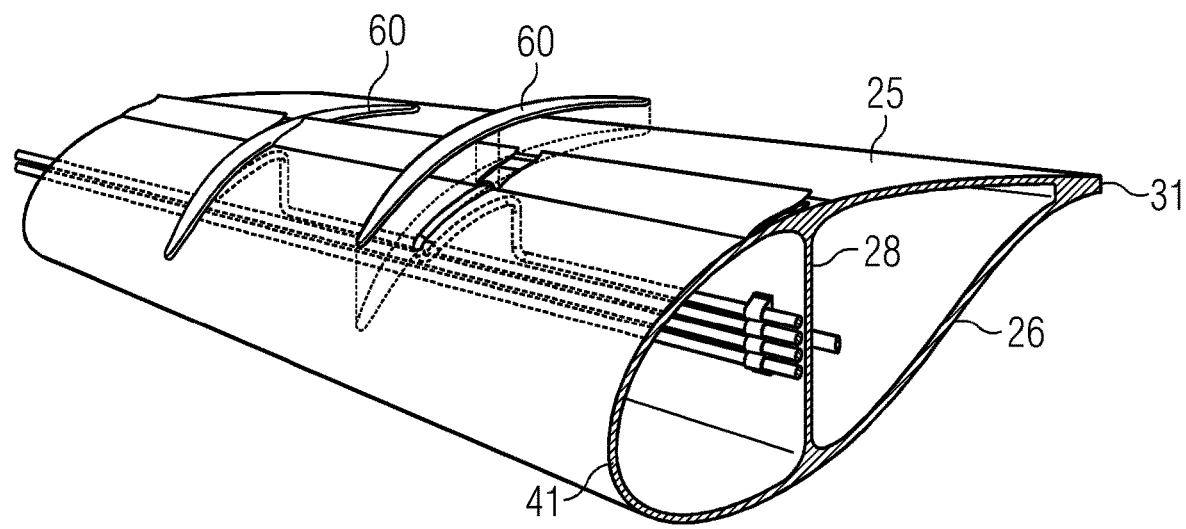
FIG. 4 shows a view of a portion of a rotor blade, according to a second embodiment of the present invention.
Figure 5:
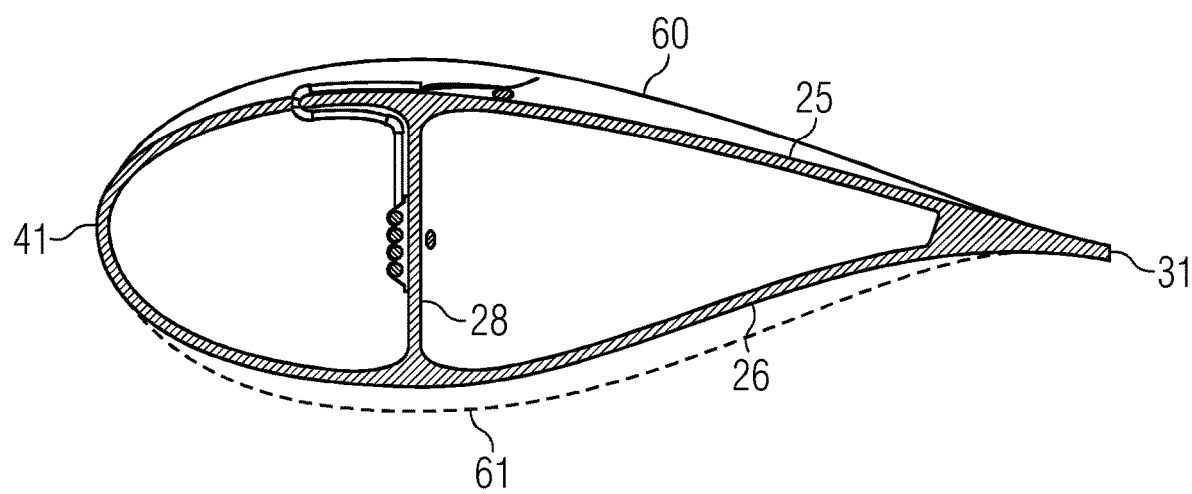
FIG. 5 shows a section view of the rotor blade of FIG. 4.

FIGS. 4 and 5 illustrate a portion of a hollow rotor blade 20 comprised between the root section 21 and the tip section 22, according to a second embodiment of the present invention. The second embodiment differentiates itself from the first embodiment in that the aerodynamic element 60 and, eventually, the second aerodynamic element 61, extend from the the leading edge 41 to the trailing edge 31.

Figure 6:
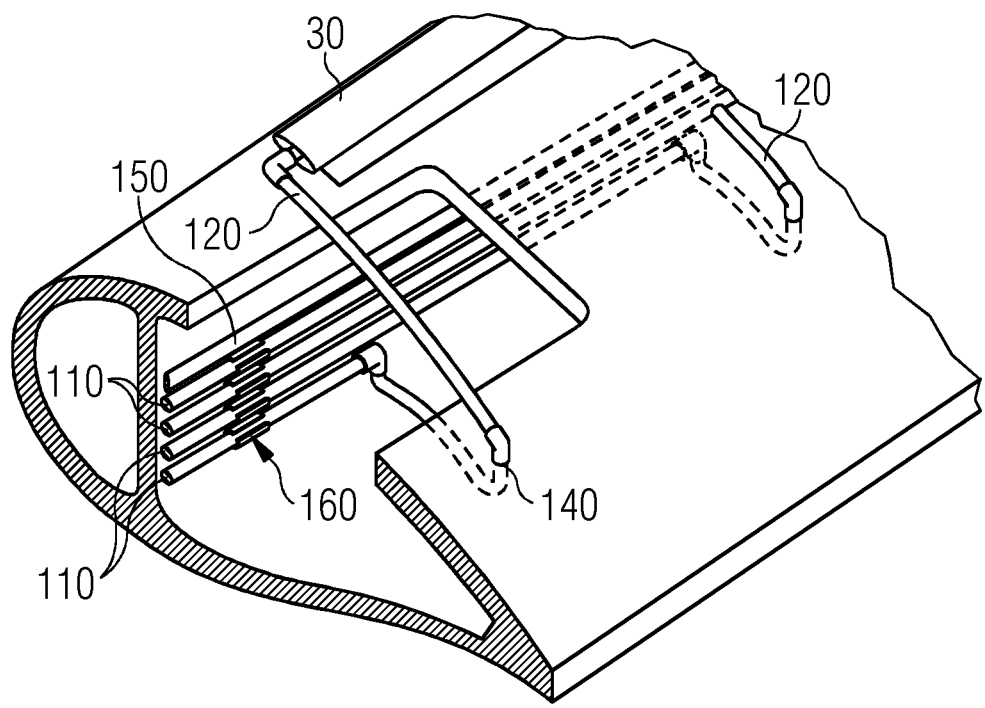
FIG. 6 shows a view of a portion of a rotor blade according to a third embodiment of the present invention.

FIG. 6 illustrates a portion of a hollow rotor blade 20 comprised between the root section 21 and the tip section 22, according to a third embodiment of the present invention. The third embodiment differentiates itself from the first embodiment in that the pressure supply system 100 comprises a plurality of inner supply lines 110 inside the trailing-edge side 32 of the rotor blade 20 and in that the external ducts 120 protrude from the suction side 25 at the trailing-edge side 32. Aerodynamic elements 60 and, eventually, second aerodynamic element 61 (not shown in the embodiment of FIG. 6) are provided similarly as in the first and in the second embodiment for covering the external ducts 120.

According to other embodiments of the present invention (not shown) the aerodynamic elements 60 may be use for shielding other types of hoses or ducts protruding from the suction side 25 or from the pressure side 26. For example, aerodynamic elements 60 may be used in connection with any active add-on, mounted on the trailing-edge side 32, e.g. trailing edge flaps activated by a pneumatic system.

According to other embodiments of the present invention (not shown) the aerodynamic elements 60 may be use for shielding other types of components protruding from the suction side 25 or from the pressure side 26. Such components may be included in other types of energy distribution systems, for example an electrical or communication circuit comprising at least one external cable protruding from the suction side 25 or the pressure side 26. In such embodiments, the aerodynamic element is attached to the suction side 25 or the pressure side 26 for shielding the external cable(s).

Figure 7:
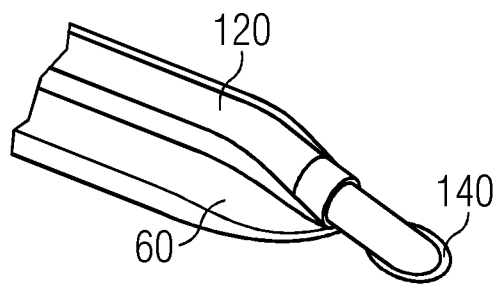
FIG. 7 shows a view of a detail of a rotor blade according to a fourth embodiment of the present invention.

FIG. 7 illustrates a fourth embodiment of the present invention. The fourth embodiment differentiates itself from the first embodiment in that the aerodynamic element 30 is attached to the external portion 120 of the energy distribution system 100, so that the aerodynamic properties of such external portions 120 are improved. Alternatively, the aerodynamic element 60 may be made integral with the external portion 120 of the energy distribution system 100. In the latter embodiment, the external portion 120 of the energy distribution system 100 is shaped itself in order to comprise the aerodynamic element 60, which provides the required aerodynamic properties to the external portions 120 of the energy distribution system 100.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade for a wind turbine, comprising:
   a suction side and a pressure side extending between a leading edge and a trailing edge;
   an energy distribution system having at least one external portion protruding from the suction side or the pressure side through a shell hole;
   at least one aerodynamic element attached to the suction side or the pressure side for aerodynamically shielding the at least one external portion of the energy distribution system;
   at least one active aerodynamic device; and
   a pneumatic actuator;
   wherein the energy distribution system is a pressure supply system activating the at least one active aerodynamic device provided on the suction side or the pressure side, the at least one active aerodynamic device being moved by means of the pneumatic actuator fed by the pressure supply system, the pressure supply system comprising at least one external duct protruding from the suction side or the pressure side, the at least one aerodynamic element being attached to the suction side or the pressure side for covering the shell hole and at least one external duct.

2. The blade according to claim 1, wherein the at least one aerodynamic element is attached to the at least one external portion of the energy distribution system.

3. The blade according to claim 1, wherein the at least one aerodynamic element is made integral with the at least one external portion of the energy distribution system.

4. The blade according to claim 1, wherein a layer of glue is interposed between the at least one aerodynamic element and the suction side or the pressure side.

5. A wind turbine including at least the blade according to claim 1.

6. The blade according to claim 1, wherein a movement of the at least one active aerodynamic device is independent of the at least one aerodynamic element.

7. A blade for a wind turbine, comprising:
   a suction side and a pressure side extending between a leading edge and a trailing edge;
   an energy distribution system having at least one external portion protruding from the suction side or the pressure side;
   at least one aerodynamic element attached to the suction side or the pressure side for aerodynamically shielding the at least one external portion of the energy distribution system;
   at least one active aerodynamic device that is separate from the at least one aerodynamic element; and
   a pneumatic actuator;

wherein the energy distribution system is a pressure supply system activating the at least one active aerodynamic device provided on the suction side or the pressure side, the at least one active aerodynamic device being moved by means of the pneumatic actuator fed by the pressure supply system, the pressure supply system comprising at least one external duct protruding from the suction side or the pressure side, the at least one aerodynamic element being attached to the suction side or the pressure side for covering the at least one external duct.

* * * * *